(12) United States Patent
Dong et al.

(10) Patent No.: US 10,539,735 B2
(45) Date of Patent: Jan. 21, 2020

(54) BACKLIGHT SOURCE, METHOD FOR PRODUCING THE SAME AND USE OF THE SAME, DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ruijun Dong, Beijing (CN); Dong Chen, Beijing (CN); Haiwei Sun, Beijing (CN); Chenru Wang, Beijing (CN); Jianjie Wu, Beijing (CN); Lili Chen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/545,317

(22) PCT Filed: Jan. 9, 2017

(86) PCT No.: PCT/CN2017/070634
§ 371 (c)(1),
(2) Date: Jul. 21, 2017

(87) PCT Pub. No.: WO2017/206515
PCT Pub. Date: Dec. 7, 2017

(65) Prior Publication Data
US 2018/0217318 A1  Aug. 2, 2018

(30) Foreign Application Priority Data

Jun. 3, 2016  (CN) .......................... 2016 1 0390035

(51) Int. Cl.
*G02F 1/1333* (2006.01)
*F21V 8/00* (2006.01)
(Continued)

(52) U.S. Cl.
CPC .............. *G02B 6/0073* (2013.01); *F21V 9/30* (2018.02); *G02B 6/0055* (2013.01);
(Continued)

(58) Field of Classification Search
CPC .. G02B 6/0001; G02B 6/0018; G02B 6/0023; G02B 6/0025; G02B 6/0031;
(Continued)

(56) References Cited

U.S. PATENT DOCUMENTS 9,274,264 B2 * 3/2016 Fan ...................... G02B 6/0001
2010/0243053 A1 * 9/2010 Coe-Sullivan ......... B82Y 30/00
136/259

(Continued)

FOREIGN PATENT DOCUMENTS

CN        101666932 A     3/2010
CN        203025371 U     6/2013
(Continued)

OTHER PUBLICATIONS

International Search Report and Written Opinion, for PCT Patent Application No. PCT/CN2017/070634, dated Apr. 13, 2017, 18 pages.

*Primary Examiner* — Zheng Song
(74) *Attorney, Agent, or Firm* — Kinney & Lange, P.A.

(57) ABSTRACT

A backlight source includes: an LED light source for emitting a visible light, a light guide plate and an infrared quantum point, wherein the LED light source is arranged on a light incidence side of the light guide plate and the infrared quantum point is arranged on at least one face of the light guide plate. And the infrared quantum point is excited by a part of the visible light emitted from the LED light source to emit an infrared light. The other part of visible light emitted from the LED light source exits uniformly a light exit face of the light guide plate along with the infrared light. The infrared quantum point is arranged on at least one face of the light guide plate other than the light incidence face and the light exit face.

3 Claims, 3 Drawing Sheets

(51) Int. Cl.
*F21V 9/30* (2018.01)
*G02F 1/1335* (2006.01)
*G06F 3/01* (2006.01)
*G06K 9/00* (2006.01)

(52) U.S. Cl.
CPC ........ *G02B 6/0065* (2013.01); *G02F 1/13338* (2013.01); *G02F 2001/133614* (2013.01); *G02F 2203/11* (2013.01); *G06F 3/013* (2013.01); *G06K 9/00006* (2013.01)

(58) Field of Classification Search
CPC .... G02B 6/005; G02B 6/0055; G02B 6/0065; G02B 6/0073; G02B 6/0026; G02B 6/0035; G02F 1/13338; G02F 1/133514; G02F 1/1336; G02F 2001/133614; G02F 2203/11; H01L 33/50
See application file for complete search history.

(56) References Cited

U.S. PATENT DOCUMENTS

2014/0071709 A1    3/2014   Ren et al.
2014/0318601 A1*  10/2014   Uchida ................ H01L 31/055
                                              136/247
2015/0378089 A1   12/2015   Oba et al.
2016/0033822 A1    2/2016   Jiang et al.
2016/0083646 A1    3/2016   Yang et al.
2016/0146999 A1*   5/2016   Yang ................... C09K 11/7492
                                              362/606
2016/0195663 A1*   7/2016   Coe-Sullivan ......... G02B 6/005
                                              362/606
2017/0219758 A1*   8/2017   Jang .................... G02B 6/0023
2018/0067362 A1*   3/2018   Lee .................... G02F 1/133603

FOREIGN PATENT DOCUMENTS

CN    104121521  A        10/2014
CN    104409592     *      3/2015   ......... C09K 11/7492
CN    105205438  A        12/2015
CN    105242457  A         1/2016
CN    105278157  A         1/2016
CN    105353557  A         2/2016
CN    205103524  U         3/2016
CN    106094330  A        11/2016

* cited by examiner

BACKLIGHT SOURCE, METHOD FOR PRODUCING THE SAME AND USE OF THE SAME, DISPLAY DEVICE

CROSS-REFERENCE TO RELATED APPLICATION

This application claims benefit of the Chinese Patent Application No. 201610390035.X, filed with SIPO on Jun. 3, 2016, which is incorporated herein by reference in its entirety.

BACKGROUND OF THE DISCLOSURE

Field of the Disclosure

Embodiments of the present disclosure relate to a backlight source, a method for producing the backlight source and use of the backlight source, as well as a display device including the backlight source.

Description of the Related Art

At present, most of display devices display images by means of a backlight source arrangement lighting a liquid crystal display screen. And, as the technology develops, various new technologies such as infrared fingerprint recognition, infrared eyeball tracing begin to be applied in the display device gradually. Thus, it needs to provide light sources that can emit infrared lights.

SUMMARY

An object of the present disclosure is intended to at least alleviate at least one of the issues in the prior art.

In accordance with an aspect of the present disclosure, it provides a backlight source, comprising: an LED light source for emitting a visible light; a light guide plate having a light incidence face and a light exit face, the light guide plate having a light incidence side on which the light incidence face is located; an infrared quantum point; wherein the LED light source is arranged on the light incidence side of the light guide plate and the infrared quantum point is arranged on at least one face of the light guide plate such that it is able to receive part of the visible light emitted from the LED light source and emit an infrared light.

In an embodiment, the infrared quantum point is arranged on at least one face of the light guide plate other than the light incidence face and the light exit face.

In an embodiment, the infrared quantum point is arranged on partial region of the light incidence face and the light exit face of the light guide plate.

In an embodiment, the light guide plate is an edge lighting light guide plate and the infrared quantum point is arranged a side of the light guide plate in opposite to the light incidence side.

In an embodiment, the backlight source further comprises a glue frame and a reflective layer is arranged on an inner face of the glue frame facing the light guide plate and configured to reflect the visible light and/or the infrared light emitted from the light guide plate back to the light guide plate.

In an embodiment, the infrared light emitted from the infrared quantum point has a wavelength of 950 nm.

In an embodiment, the infrared quantum point has a size less than the thickness of the light guide plate.

In an embodiment, a quantum point protection layer is coated on outside of the infrared quantum point.

In accordance with another aspect of the present disclosure, it provides a method for producing a backlight source, the method comprising:

mounting an LED light source which emits a visible light on a light incidence side of the light guide plate of the backlight source;

mixing infrared quantum points into photo curable adhesives;

dripping an infrared quantum point droplet mixed with the infrared quantum points onto at least one face of the light guide plate.

In one embodiment, an infrared quantum point droplet mixed with the infrared quantum points is dipped onto at least one face of the light guide plate other than the light incidence face and the light exit face.

Further, the method further comprises:

after the infrared quantum point droplet is cured, coating a quantum point protection layer on outside of the cured infrared quantum point droplet.

In an embodiment, the infrared quantum points have sizes less than the thickness of the light guide plate.

In accordance with a further aspect of the present disclosure, it also provides a display device comprising the backlight source described in any of the above embodiments.

In accordance with a yet further aspect of the present disclosure, it also provides a usage of the backlight source described in any of the above embodiments, wherein the backlight source is applied in infrared fingerprint recognition and infrared eyeball tracing.

Other objects and advantages of the present disclosure become apparent by means of the description of the present disclosure with reference to drawings. It also may contribute to comprehensive understanding of the present disclosure.

DETAILED DESCRIPTION OF PREFERRED EMBODIMENTS OF THE DISCLOSURE

Figure 1:
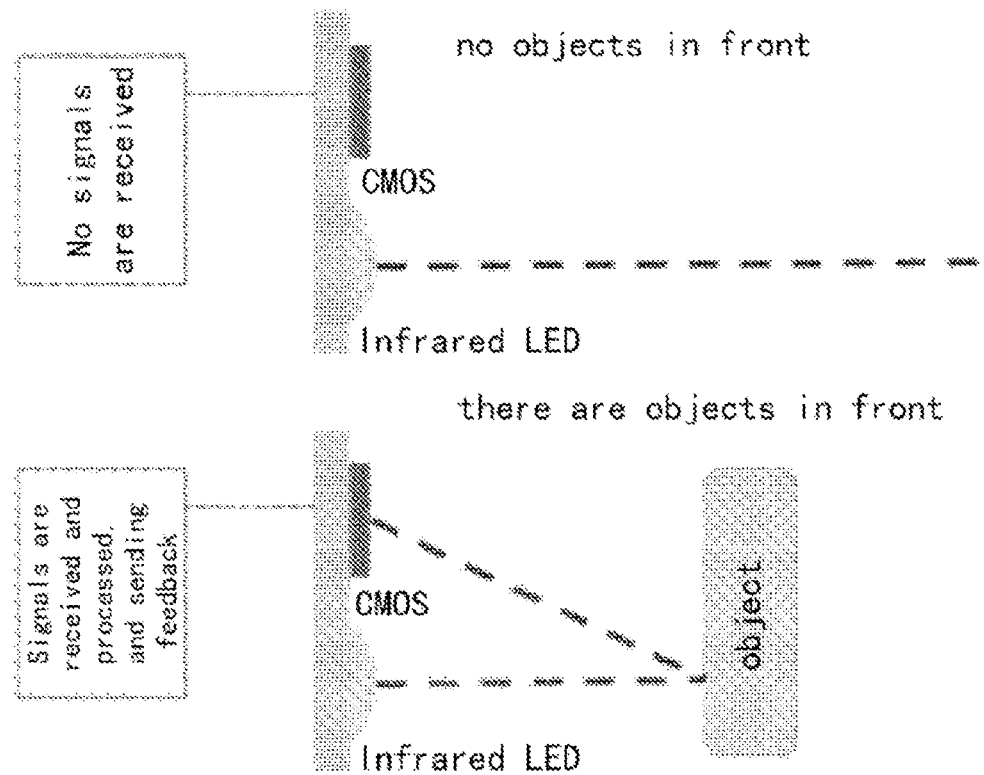
FIG. 1 shows a work principle diagram of an infrared detector module in the conventional backlight source.

Below, technical solutions of embodiments of the present disclosure will further be described in conjunction with the embodiments and drawings for the embodiments. In the description, same or similar reference numerals indicate same or similar parts. The following description of the embodiments with reference to the drawings is intended to explain the general concept of the present disclosure, instead of limiting the present disclosure.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the conventional light sources using technologies such as infrared fingerprint recognition, infrared eyeball tracing, a separate infrared LED is mainly used as an emitter and forms a separate infrared detector module along with an infrared receiver (CMOS shown in FIG. 1). Its work principle is shown in FIG. 1. Such detector can only be mounted separately by surface mount technology (SMT). Such arrangement has a low integration and needs to provide separate infrared light sources to increase power consumption of system. In addition, it also needs to be assembled separately to add procedures for production.

The quantum point is quasi-zero dimensional nanometer material and has regular atom arrangement similar to crystal. Because the quantum point has relative high specific surface area and suitable band gap width, it is considered as an ideal photoluminescence material. By means of characteristics of the quantum point, the present disclosure uses the infrared quantum point to convert a part of visible light emitted from the LED light source into infrared light, so as to avoid providing separate infrared light emitters and avoid providing separate power supply for infrared emitters. The visible light that may be dissipated in the prior art or conventionally is converted into the infrared light, thus the system power consumption is reduced significantly and utilization efficiency of light is improved.

In accordance with an aspect of the generic concept of the present disclosure, it provides a backlight source, including: an LED light source for emitting a visible light, a light guide plate and an infrared quantum point, wherein the LED light source is arranged on a light incidence side of the light guide plate and the infrared quantum point is arranged on at least one face of the light guide plate. And the infrared quantum point is excited by part of the visible light emitted from the LED light source to emit an infrared light. The other part of visible light emitted from the LED light source exits uniformly a light exit face of the light guide plate along with the infrared light.

Figure 2:
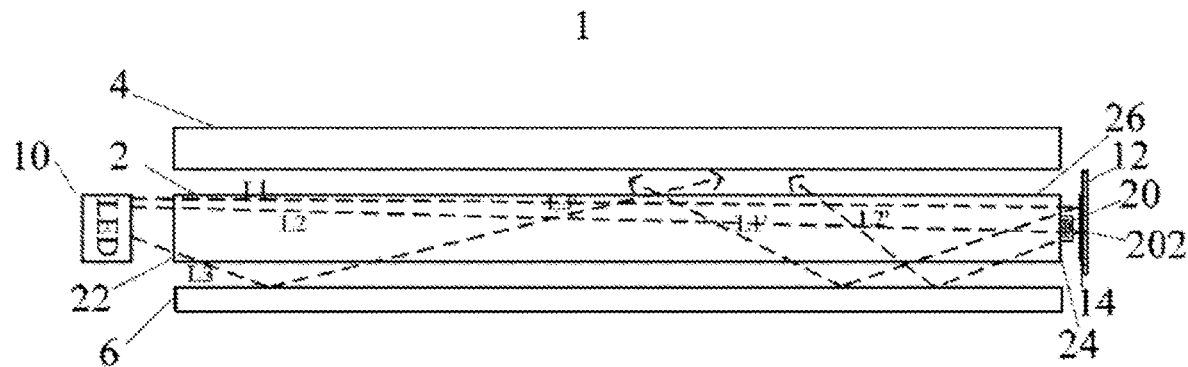
FIG. 2 is a schematic view showing a structure of a backlight source according to an embodiment of the present disclosure.

FIG. 2 is a schematic view showing a structure of a backlight source according to an embodiment of the present disclosure. As illustrated in FIG. 2, the backlight source 1 includes a light guide plate 2, a prism sheet 4, a reflector 6 and a light emitting diode (LED) 10 as a light source. And, FIG. 2 also shows schematically that the backlight light source 1 includes a glue frame 12. FIG. 2 shows only one part of the glue frame. A reflective layer 14 is arranged on an inner face (i.e., the face facing towards the light guide plate 2) of the glue frame and configured to reflect the visible light and/or the infrared light emitted from the light guide plate 2 back to the light guide plate 2. The light guide plate 2 has a light incidence face 22 for light incidence and a light exit face 26 for light exiting. The LED light source 10 is arranged on the side of the light guide plate 2 where the light incidence face 22 is located, to emit the visible light. In the embodiment of the present disclosure, in order to produce the infrared light, the infrared quantum points 20 may be arranged on at least one face of the light guide plate 2 other than the light incidence face and the light exit face. In this way, the infrared quantum points 20 are excited by part of the visible light emitted from the LED light source 10 to emit the infrared light, then the other part of the visible light emitted from the LED light source 10 and the infrared light exit the light exit face 26 of the light guide plate 2 together. The skilled person in the art would appreciate that the exiting visible light is configured for image display of the display device and the exiting infrared light is configured to cooperate with the infrared receiver in the display device to be applied in infrared light applications such as infrared eyeball tracing and infrared fingerprint recognition.

In the embodiment shown in FIG. 2, the LED light source 10 is arranged on a side of the light guide plate 2 (i.e., the left side 22 shown in FIG. 2), that is, the backlight source 1 shown in FIG. 2 is an edge lighting backlight source. The LED light source 10 is arranged on the side of the light guide plate 2 with the light incidence face 22. The infrared quantum points 20 are arranged on a surface 24 of the light guide plate 2 in opposite to the light incidence face 22. In this way, a part of the visible light emitted from the LED light source 10 will not be incident onto the infrared quantum points 20. This part of the visible light exits the light exit face 26 still as the visible light. At the same time, another part of the visible light emitted from the LED light source 10 will be incident onto the infrared quantum points 20. At this time, the infrared quantum points 20 are excited by the another part of the visible light to emit the infrared light. Then the part of the visible light emitted from the LED light source 10 exits the light exit face 26 of the light guide plate 2 along with the infrared light.

Various propagation paths of the lights emitted from the LED light source 10 are explained below with reference to three beams of visible lights L1, L2, L3 emitted from the LED light source 10. As illustrated in FIG. 2, the visible lights L1, L2 emitted from the LED light source 10 are illuminated onto the surface 24 in opposite to the light incidence face 22 while the visible light L3 is illuminated onto the reflector 6. Because the infrared quantum points 20 are arranged on the surface 24 and spaced to each other, the visible light L1 is not incident onto the infrared quantum points 20, but is reflected by the reflective layer 14 on the glue frame 12 to travel towards the reflector 6 through the light guide plate 2. The visible light L2 is incident onto the infrared quantum points 20 which are excited by the visible light L2 to emit the infrared light, and then the infrared light is reflected by the reflective layer 14 on the glue frame 12 to travel towards the reflector 6 through the light guide plate 2. Finally, by means of reflection of the reflector 6, the visible lights L1, L2, L3 are converted into the visible light L1', the infrared light L2' and the visible light L3' respectively, which exit the light exit face 26 of the light guide plate 2. Thus, the embodiment of the present disclosure only converts the part of the visible light that may be initially or originally dissipated into the infrared light without providing separate power supply of infrared emitters, thereby reducing the power consumption of the system significantly. Further, in the conventional backlight source with separate infrared emitters, the infrared light is emitted only from one point of an infrared emitter. In contrast, in the backlight source in the embodiment of the present disclosure, the infrared light may exit the whole light exit face uniformly, which is beneficial to application of technologies such as infrared eyeball tracing and infrared fingerprint recognition.

It should be noted that the infrared light quantum points 20 shown in FIG. 2 are arranged on a surface in opposite to the LED light source, but in other embodiments, the infrared quantum points 20 may also be arranged on at least part of regions on the light incidence face and/or the light exit face.

Optionally, as shown in FIG. 2, a quantum point protection layer 202 is coated on outside of the infrared quantum points 20 to prevent the infrared quantum points 20 from failure due to corrosion of water, oxygen.

Figure 3:
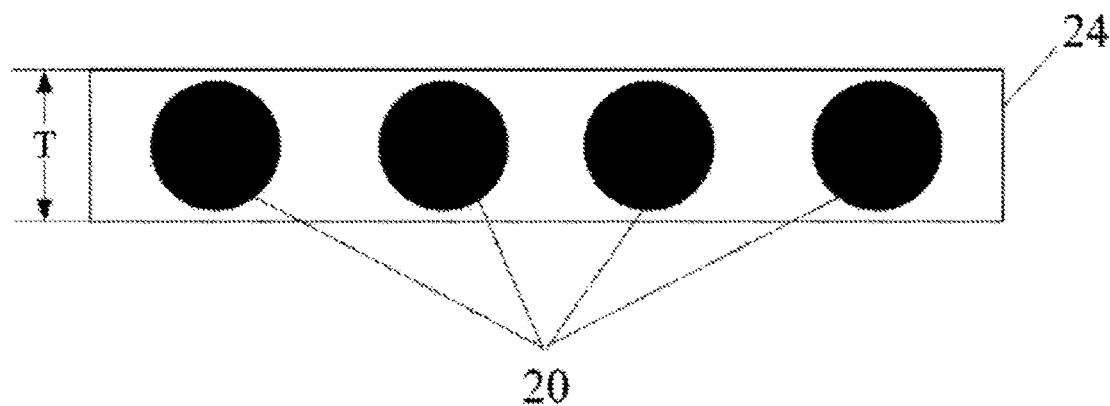
FIG. 3 is a right side view of the structure of the backlight source shown in FIG. 2, wherein the quantum point protection layer shown in FIG. 2 is removed so as to illustrate an infrared quantum point.

FIG. 3 shows a right side view of the structure of the backlight source shown in FIG. 2. In FIG. 3, the quantum point protection layer 202 in FIG. 2 is removed so as to show the infrared quantum point 20. As shown in FIG. 3, the infrared quantum point 20 has a circular cross section. In accordance with an embodiment, the infrared quantum point 20 has a diameter smaller than thickness T of the light guide plate 2. In this way, it is ensured that the infrared quantum point 20 does not fail due to corrosion of water, oxygen. Although FIG. 3 shows four infrared quantum points 20, it may arrange more or less quantum points as required in practice. Although FIG. 3 shows that the infrared quantum point 20 is circular, the infrared quantum point may not necessarily be circular. In this circumstance, optionally, the whole size of the infrared quantum point 20 is less than the thickness T of the light guide plate 2.

In the embodiment shown in FIG. 2, after the infrared light exits the light exit face 26 of the light guide plate 2, it also needs to exit through a liquid crystal panel (not shown). The liquid crystal panel has transmissivity of about 18% to 30% to the infrared light. The transmissivity will vary depending on difference in resolution and size of the panel. The infrared light with the wavelength of about 950 nm has maximum transmissivity in the infrared wavelength band. Thus, in an embodiment, the infrared light with the wavelength of about 950 nm is emitted by the infrared quantum point 20.

Figure 4:
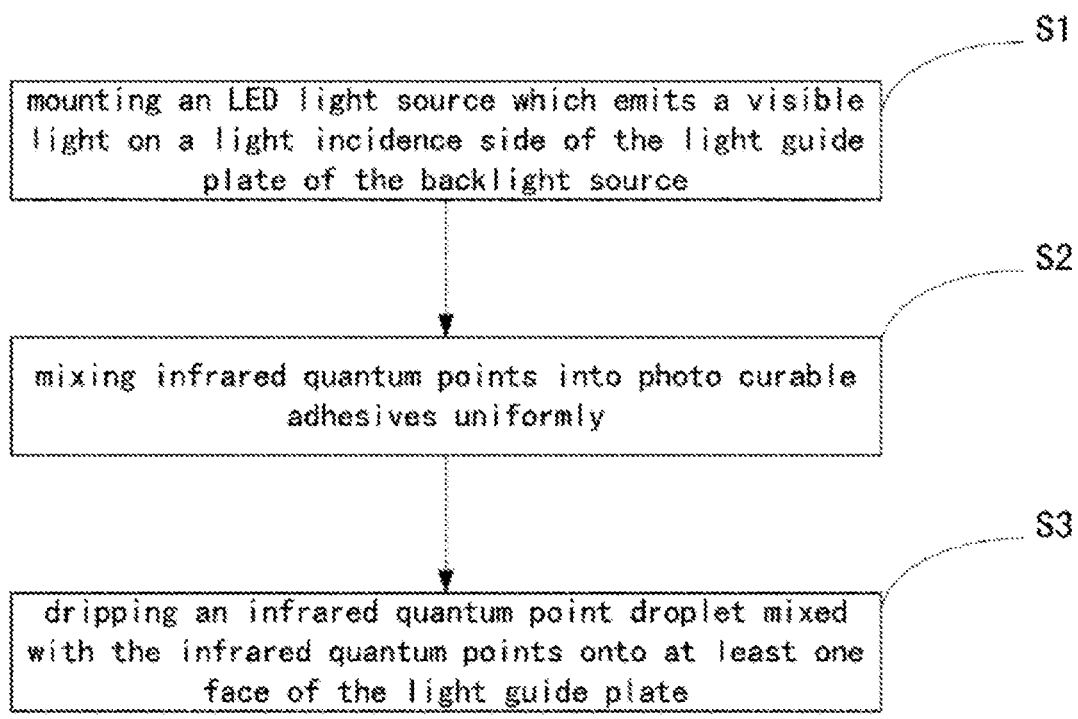
FIG. 4 is a flow chart of a method for producing the backlight source according to an embodiment of the present disclosure.

In addition, an embodiment of the present disclosure also provides a method for producing the backlight source 1 as described above. As illustrated in FIG. 4, the method may include the following steps:

S1, mounting an LED light source 10 which emits a visible light on a light incidence side of the light guide plate 2 of the backlight source 1;

S2, uniformly mixing infrared quantum points 20 into photo curable adhesives in a liquid form;

S3, dripping an infrared quantum point droplet mixed with the infrared quantum points 20 onto at least one face of the light guide plate 2.

In an embodiment, in the step S2, the infrared quantum point droplet mixed with the infrared quantum points 20 is dripped onto at least one face of the light guide plate 2 other than the light incidence face and the light exit face.

In another embodiment, in the step S1, the LED light source 10 is mounted on the side of the light guide plate 2 with the light incidence face 22; and in the step S2, the infrared quantum point droplet mixed with the infrared quantum points 20 is dripped onto a surface 24 of the light guide plate 2 in opposite to the light incidence face 22.

In accordance with an embodiment, the method may further include the following step of:

S4, after the infrared quantum point droplet with the infrared quantum points is cured, coating a quantum point protection layer 202 on outside of the cured infrared quantum point droplet.

In an embodiment, the infrared quantum points 20 have diameters less than the thickness of the light guide plate 2.

Further, an embodiment of the present disclosure also provides a display device including the backlight source 1 as described above.

In an exemplified embodiment, the display device further includes an infrared receiver. In the above backlight source 1, the part of the visible light emitted from the LED light source 10 exits the light exit face 26 of the light guide plate 2 along with the infrared light and the exiting visible light is configured for image display of the display device. The exiting infrared light is received by the infrared receiver after it is reflected by an eyeball or a finger, so as to achieve infrared eyeball tracing or infrared fingerprint recognition.

Further, the backlight source 1 described as above may be applied in infrared fingerprint recognition and/or infrared eyeball tracing.

In various embodiments of the present disclosure, the visible light source with the backlight source is directly used to excite the infrared quantum points to emit the infrared light without providing separate infrared emitters. It may further improve the integration level of the structure of the backlight source and reduce the power consumption of the system while reducing assembling procedures. And in the backlight source of the present disclosure, the infrared light may exit the whole light exit face of the light guide plate uniformly, which contributes to the application of technologies such as the infrared eyeball tracing and the infrared fingerprint recognition.

In the above respective embodiments, the concept of the present disclosure has been illustrate and described with reference to the edge lighting backlight source. The skilled person in the art should understand the technical concept of the present disclosure may be applied in other types and/or structures of the backlight source without departing from the principles and spirits of the generic concept of the present disclosure.

The present disclosure has been explained with reference to drawings. However, the examples shown in drawings are only intended to exemplarily illustrate the embodiments of the present disclosure by way of examples, instead of limiting the present disclosure.

Although some of embodiments according to a general concept of the present disclosure have been illustrated and explained, the skilled person in the art will understand that these embodiments may be modified without departing from principles and spirits of the generic concept of the present disclosure. The scope of the present disclosure will be defined by the appended claims and equivalents thereof.

What is claimed is:

1. A method for producing a backlight source, the method comprising:
   mounting an LED light source configured to emit a visible light on a light incidence side of a light guide plate of the backlight source;
   mixing infrared quantum points into photo curable adhesives; and
   dripping an infrared quantum point droplet mixed with the infrared quantum points onto at least one face of the light guide plate,
   wherein the light guide plate is an edge lighting light guide plate and the infrared quantum point is arranged on a side of the light guide plate opposite to the light incidence side such that it is able to receive a first part of the visible light emitted from the LED light source and emit an infrared light back to the light guide plate, and a second part of the visible light emitted from the LED light source exits the light exit face of the light guide plate along with the infrared light.

2. The method according to claim 1, further comprising:
   after the infrared quantum point droplet is cured, coating a quantum point protection layer outside the cured infrared quantum point droplet.

3. The method according to claim 1, wherein the infrared quantum points have a size less than a thickness of the light guide plate.

* * * * *